(12) United States Patent
Millar et al.

(10) Patent No.: US 9,025,416 B2
(45) Date of Patent: May 5, 2015

(54) SONAR SYSTEM FOR AUTOMATICALLY DETECTING LOCATION OF DEVICES

(75) Inventors: James Millar, Clovis, CA (US); Farzin Aghdasi, Clovis, CA (US); Greg Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 427 days.

(21) Appl. No.: 13/335,299

(22) Filed: Dec. 22, 2011

(65) Prior Publication Data

US 2013/0163382 A1 Jun. 27, 2013

(51) Int. Cl.
| | |
|---|---|
| *G01S 3/80* | (2006.01) |
| *G01S 13/46* | (2006.01) |
| *G01S 15/87* | (2006.01) |
| *G01S 15/02* | (2006.01) |

(52) U.S. Cl.
CPC ............... *G01S 13/46* (2013.01); *G01S 15/874* (2013.01); *G01S 15/025* (2013.01); *G01S 2013/466* (2013.01)

(58) Field of Classification Search
CPC ......... G01S 3/80; G01S 15/74; G01S 15/874; G01S 2013/466; G01S 15/025; G08B 13/196; G06T 7/0018
USPC ......................................................... 367/127
See application file for complete search history.

(56) References Cited

U.S. PATENT DOCUMENTS

| | | | |
|---|---|---|---|
| 3,860,900 A * | 1/1975 | Scudder ............................ | 367/6 |
| 4,939,701 A | 7/1990 | Brunner et al. | |
| 5,581,257 A | 12/1996 | Greene et al. | |
| 6,470,002 B1 * | 10/2002 | Jones et al. ................... | 367/127 |
| 7,154,395 B2 | 12/2006 | Raskar et al. | |
| 7,710,824 B1 | 5/2010 | Katzer et al. | |
| 7,756,415 B2 | 7/2010 | Huseth et al. | |
| 7,778,651 B2 | 8/2010 | Billhartz | |
| 2008/0211910 A1 | 9/2008 | Niem et al. | |
| 2013/0163382 A1* | 6/2013 | Millar et al. .................. | 367/127 |

FOREIGN PATENT DOCUMENTS

| | | |
|---|---|---|
| CN | 1989421 A | 6/2007 |
| WO | WO 2006013512 A1 * | 2/2006 |

(Continued)

OTHER PUBLICATIONS

International Search Report and Written Opinion for PCT/US2012/069750, mailed Sep. 6, 2013.

(Continued)

*Primary Examiner* — Daniel Pihulic (74) *Attorney, Agent, or Firm* — Hunter Clark PLLC (57) ABSTRACT

Systems and methods are described for determining device positions in a video surveillance system. A method described herein includes generating a reference sound; emitting, at a first device, the reference sound; detecting, at the first device, a responsive reference sound from one or more second devices in response to the emitted reference sound; identifying a position of each of the one or more second devices; obtaining information relating to latency of the one or more second devices; computing a round trip time associated with each of the one or more second devices based on at least a timing of detecting the one or more responsive reference sounds and the latency of each of the one or more second devices; and estimating the position of the first device according to the round trip time and the position associated with each of the one or more second devices.

23 Claims, 6 Drawing Sheets

(56) References Cited

FOREIGN PATENT DOCUMENTS

| WO | 2008009520 A1 | 1/2008 |
| WO | WO 2013137958 A3 * | 9/2013 |

OTHER PUBLICATIONS

International Preliminary Report on Patentability for International Application No. PCT/US2012/069750, mailed Jul. 3, 2014, 8 pages.

* cited by examiner

SONAR SYSTEM FOR AUTOMATICALLY DETECTING LOCATION OF DEVICES

BACKGROUND

Video surveillance systems are commonly used to monitor indoor and outdoor areas using video cameras positioned at various locations within the area to be monitored. Video surveillance systems are commonly implemented via networks of multiple surveillance cameras to facilitate monitoring of large areas. In order for a surveillance system including multiple cameras to operate intelligently, the cameras are calibrated so that they are aware of their location and the location of other cameras nearby. This calibration enables cameras within the system to cooperate in an intelligent manner, which in turn enables inter-camera analytics to be employed within a surveillance system and opens up possibilities for more intelligent video and audio analytics within the system.

In existing surveillance systems, the location of each camera in the system is manually provided, e.g., as user input. However, manual entry of camera locations is tedious and prone to errors and inaccuracies. As the number of cameras in the surveillance system increases, the probability that one or more cameras in the system are associated with incorrect and/or inaccurate position information similarly increases. These location errors can, in turn, reduce the ability of the cameras to operate together in an effective manner.

SUMMARY

An example of a method of calculating position of a device within a video surveillance system according to the disclosure includes generating a reference sound; emitting, at a first device, the reference sound; detecting, at the first device, a responsive reference sound from each of one or more second devices in response to the emitted reference sound; identifying a position of each of the one or more second devices; obtaining information relating to a latency of each of the one or more second devices; computing a round trip time associated with each of the one or more second devices based on at least a timing of detecting each of the one or more responsive reference sounds and the latency of each of the one or more second devices; and estimating the position of the first device according to the round trip time and the position associated with each of the one or more second devices.

Implementations of the method may include one or more of the following features. Converting the round trip time associated with each of the one or more second devices to the distance between the first device and each of the one or more second devices based on a sample rate of the reference sound and each of the one or more responsive reference sounds. Estimating the position of the first device by performing trilateration with respect to the positions of at least four second devices and distances between the first device and the at least four second devices. Identifying information relating to one or more device mounting surfaces in the video surveillance system and estimating the position of the first device according to the distance between the first device and each of the one or more second devices and the information relating to the one or more mounting surfaces. The information relating to the one or more mounting surfaces comprises a three-dimensional model of the video surveillance system. Detecting, at the first device, the reference sound; starting a first timer at the first device in response to detecting the reference sound; and stopping the first timer in response to detecting a responsive reference sound from at least one of the one or more second devices. Obtaining a value of a second timer maintained by each of the one or more second devices in association with generating and emitting the responsive reference sound and computing a round trip time corresponding to a selected second device by dividing a result of subtracting the second timer of the selected second device from the first timer by 2. Identifying ambient noise in audio received at the first device; removing the ambient noise from the audio received at the first device to obtain resulting audio; and detecting the responsive reference sounds within the resulting audio. Receiving the position of at least one of the one or more second devices as user input. The reference sound and each of the responsive reference sounds are at least one of an audible ping or an audio pulse.

An example of a security device positioning system according to the disclosure includes a digital audio processor configured to generate a reference sound; a speaker communicatively coupled to the digital audio processor and configured to emit, at a first security device, the reference sound; a microphone communicatively coupled to the digital audio processor and configured to detect, at the first security device, a responsive reference sound from each of one or more second security devices; a timer communicatively coupled to the digital audio processor, the speaker and the microphone and configured to measure, for each of the one or more second security devices, elapsed time between the speaker emitting the reference sound and the microphone detecting the responsive reference sound from each of the one or more second security devices; a communication interface communicatively coupled to the timer and configured to communicate information relating to the elapsed time for each of the one or more second security devices, position of each of the one or more second security devices and latency of each of the one or more second security devices; a processor communicatively coupled to the communications subsystem and configured to compute a round trip time associated with each of the one or more second security devices based on at least the elapsed time of each of the one or more second security devices and the latencies of each of the one or more second security devices and to estimate the position of the first security device according to the round trip time associated with each of the one or more second security devices and the position of each of the one or more second security devices; and a memory communicatively coupled to the communication interface and the processor.

Implementations of the system may include one or more of the following features. The processor is further configured to convert the round trip time associated with each of the one or more second security devices to distance between the first security device and each of the one or more second security devices based on a sample rate of the reference sound and each of the responsive reference sounds. The processor is further configured to estimate the position of the first security device by performing trilateration with respect to the positions of at least four second security devices and distances between the first security device and the at least four second security devices. The memory is configured to store data relating to one or more device mounting surfaces in the video surveillance system, and the processor is configured to estimate the position of the first security device according to the distance between the first security device and each of the one or more second security devices and the information relating to the one or more mounting surfaces. The digital audio processor is further configured to identify ambient noise in audio received by the microphone, to remove the ambient noise from the received audio to obtain resulting audio, and to detect each of the responsive reference sounds within the resulting audio. A user terminal communicatively coupled to the processor and configured to obtain the position of at least one of the one or more second security devices as user input. The digital audio processor, the speaker, the microphone and the timer are located at the first security device. The communication interface, the processor and the memory are located at a location server.

An example of a system for estimating a position of a first device within a video surveillance system according to the disclosure includes signal generator means configured to generate a reference sound; a speaker communicatively coupled to the signal generator means and configured to emit the reference sound; a microphone communicatively coupled to the signal generator means and configured to detect responsive reference sounds from each of one or more second devices in response to the emitted reference sound; device information means configured to identify position and latency of each of the one or more second devices; time calculation means communicatively coupled to the speaker, the microphone and the device information means and configured to compute round trip time associated with each of the one or more located devices based on at least times of detecting each of the audio response pulses and the latency of each of the one or more second devices; and positioning means communicatively coupled to the time calculation means and configured to estimate the position of the first device according to each of the round trip times and the position of each of the one or more second devices.

Implementations of the system may include one or more of the following features. The positioning means is further configured to convert the round trip time associated with each of the one or more second devices to distance between the first device and each of the one or more second devices based on a sample rate of the audio pulse and the audio response pulses and to estimate the position of the first device according to each of the converted distances. The positioning means is further configured to estimate the position of the first device according to each of the converted distances and information relating to one or more device mounting surfaces in the video surveillance system. Noise reduction means communicatively coupled to the microphone and configured to identify ambient noise in audio received by the microphone and to remove the ambient noise from the audio received at the microphone to obtain resulting audio. The microphone is configured to detect the responsive reference sounds within the resulting audio. User interface means communicatively coupled to the positioning means and configured to receive the position of at least one of the one or more second devices as user input.

An example of a computer program product according to the disclosure resides on a processor-executable computer storage medium and includes processor-executable instructions configured to cause a processor to generate a reference sound; cause the reference sound to be emitted at a first device; detect a responsive reference sound at the first device from each of one or more second devices in response to the emitted reference sound; identify a position of each of the one or more second devices; obtain information relating to a latency of each of the one or more second devices; compute a round trip time associated with each of the one or more second devices based on at least a timing of detecting each of the one or more responsive reference sounds and the latency of each of the one or more second devices; and estimate the position of the first device according to the round trip time and the position associated with each of the one or more second devices.

Implementations of the computer program product may include one or more of the following features. The instructions configured to cause the processor to estimate are further configured to cause the processor to convert the round trip time associated with each of the one or more second devices to the distance between the first device and each of the one or more second devices based on a sample rate of the reference sound and each of the one or more responsive reference sounds. The instructions configured to cause the processor to estimate are further configured to cause the processor to identify information relating to one or more device mounting surfaces in the video surveillance system and estimate the position of the first device according to the distance between the first device and each of the one or more second devices and the information relating to the one or more mounting surfaces. The instructions configured to cause the processor to detect comprise instructions configured to cause the processor to identify ambient noise in audio received at the first device; remove the ambient noise from the audio received at the first device to obtain resulting audio; and detect the responsive reference sounds within the resulting audio.

Items and/or techniques described herein may provide one or more of the following capabilities, as well as other capabilities not mentioned. Inter-camera interaction in a video surveillance system can be enabled in an efficient and user-friendly manner. Positioning errors associated with cameras and/or other devices in a video surveillance system can be reduced. Cameras and/or other devices can be added to a multi-camera surveillance system based on reduced user input. A surveillance system can leverage knowledge of the manner in which devices are installed (e.g., devices mounted on a wall, pole, ceiling, etc.) to improve the accuracy of position information associated with the devices. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for utilizing sonar positioning to automatically detect the location of devices in a video surveillance system. In order for a video surveillance system to work intelligently, cameras within the system are calibrated so that they are aware of their location and the location of cameras nearby. This calibration enables inter-camera analytics, which provides possibilities for intelligent video and audio analysis. For instance, a location-aware camera system can provide intelligent visual and/or audible tracking of objects through a monitored area, among other benefits.

The techniques described herein utilize sonar techniques to determine the distance between devices in a surveillance system. A device is configured to emit an audible ping and/or other audio signal. Other devices in the system are configured to listen for this signal and, based on the travel time of the signal between the devices, determine the distance between the devices. By determining the distances to the nearest neighbors of a given device, the system can determine accurate locations of the devices in the system with reduced input from the user. Further, the techniques described herein can operate with improved performance as the number of devices in the system increases.

Figure 1:
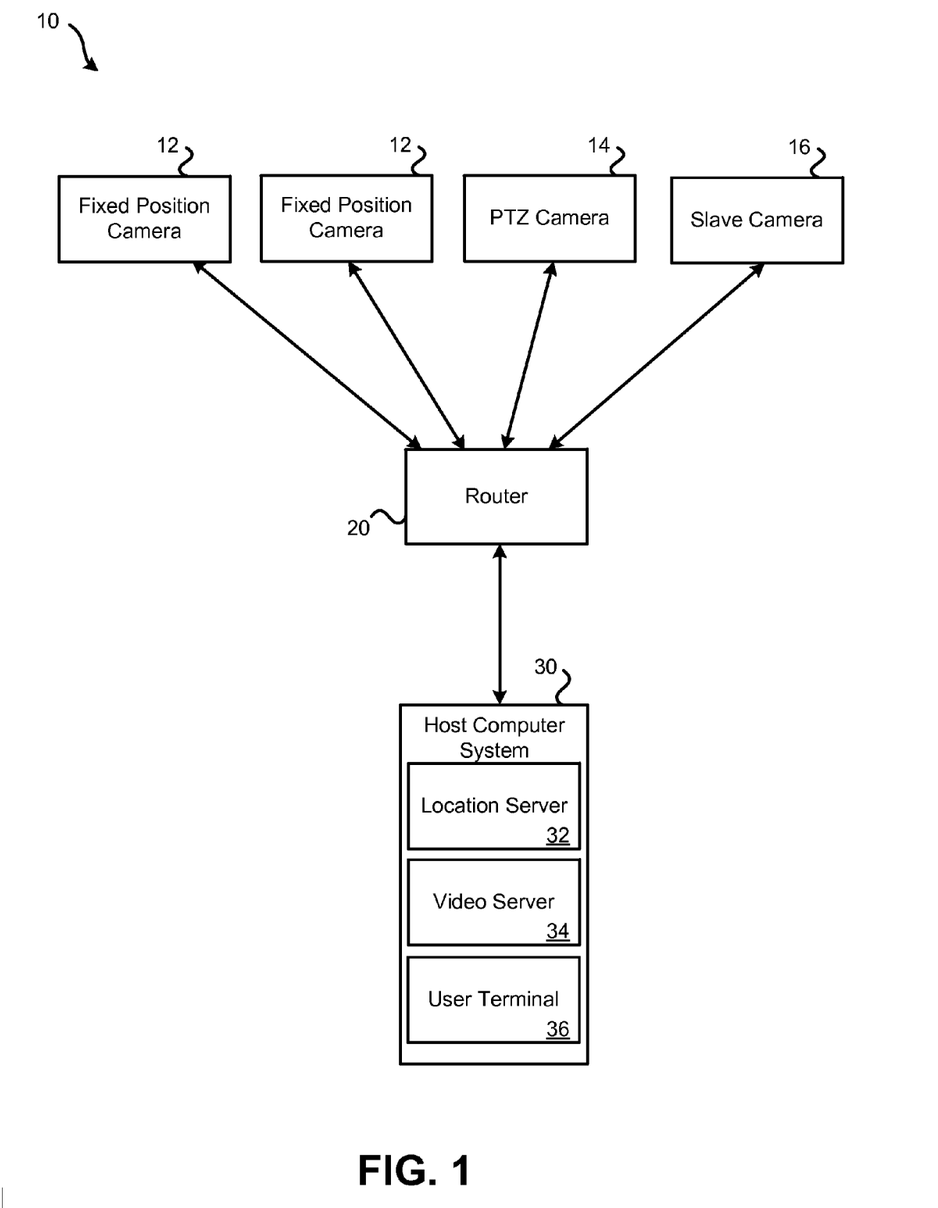
FIG. 1 is a block diagram of a security camera network.

FIG. 1 illustrates a block diagram of a security camera network 10. The security camera network 100 includes one or more video cameras including fixed position cameras 12, PTZ (Pan-Tilt-Zoom) cameras 14, slave cameras 16, etc. Security camera networks may have zero, one, or more than one of each type of camera. For example, as shown in FIG. 1, a security camera network could include two fixed position cameras 12, one PTZ camera 14 and one slave camera 16. Any other numbers and/or configurations of cameras could also be used.

The security camera network 10 also includes a router 20. The fixed position cameras 12, PTZ cameras 14, and slave cameras 16 communicate with the router 20 using a wired connection (e.g., a local area network (LAN) connection) or a wireless connection. The router 20 communicates with a computing system, such as a host computer system 30. The router 20 communicates with the host computer system 30 using either a wired connection, such as a LAN connection, or a wireless connection. In some configurations, the host computer system 30 may be located at a single computing device and/or multiple computing devices (e.g., as a distributed computer system).

A fixed position camera 12 may be set in a fixed position, such as mounted to the eaves of a building to capture a video feed of the building's emergency exit. The field of view of such a fixed position camera, unless moved or adjusted by some external force, will remain unchanged. A fixed position camera can include one or more components for capturing and processing digital images, such as a digital signal processor (DSP) and/or a video compressor.

As shown in FIG. 1, a security camera network 10 may include multiple fixed position cameras 12, which may function in a substantially similar manner. Fixed position cameras 12, assuming they are located in positions different from each other, have different points of view and fields of view. Thus, even if the same object is observed by multiple fixed position cameras 12 at the same instant in time, the perceived location, width and height of the object would vary between the different cameras.

The security camera network 10 also includes a PTZ camera 14. A PTZ camera 14 may pan, tilt, and zoom. As with the fixed position camera 12, the PTZ camera 14 can also include a digital signal processor and/or a video compressor. In order for the PTZ camera 14 to identify respective objects of interest, the PTZ camera 14 may have predefined points of view at which the PTZ camera 14 has analyzed the background and can distinguish the foreground containing moving objects from the background containing static objects. A user using the host computer system 30, e.g., via the user terminal 36, may be able to control the movement and zoom of the PTZ camera 14. Commands to control the PTZ camera 14 may be routed from the host computer system 30 to the PTZ camera 14 via the router 20. In some configurations, the PTZ camera 14 follows a set pan, tilt, and zoom pattern unless interrupted by a command from the host computer system 30.

The slave camera 16 may communicate with the host computer system 30 via the router 20. The slave camera 16 can either be a fixed position camera or a PTZ camera. The slave camera 16 is configured only to capture images and is not capable of identifying objects in the captured images. Instead, the slave camera 16 transmits either raw frames of a video feed or compressed frames of the video feed (e.g., processed via a video compressor) to the host computer system 30 via the router 20. The host computer system 30 processes frames received from the slave camera 16 to identify and track moving objects in the frames received from the slave camera 16.

The host computer system 30 includes a location server 32, a video server 34, and a user terminal 36. The location server 32 receives and stores locations of respective cameras 12-16 and/or other devices within the security camera network 10. The location server 32 can compute locations of devices within the security camera network 10 based on information obtained from a user and/or the devices themselves, or alternatively devices within the security camera network 10 can compute their own locations and submit these locations to the location server 32. Positions of devices within the security camera network 10 as maintained by the location server 32 are described in further detail below in relation to the drawings that follow.

The video server 34 receives and stores compressed and/or uncompressed video from the cameras with which the host computer system 30 is in communication. The user terminal 36 allows a user, such as a security guard, to interact with the frames of the video feeds received from the cameras and any generated metadata associated with the video feeds. The user terminal 36 can display one or more video feeds to the user at one time. The user can select an object to track using the user terminal 36. For example, if the user is viewing frames of the video feed from a fixed position camera 12 and an object the user wishes to track appears in the field of view of the fixed position camera 12, the user can select the image of the object. The host computer system 30 then leverages the positions of the cameras 12-16 of the security camera network 10 as maintained by the location server 32 to track the object as it moves between the fields of view of the cameras 12-16. If the object is visible in the fields of view of multiple cameras, a preferable field of view is selected by the host computer system 30 based on predefined rules. The user can also control the PTZ camera 14 using the user terminal 36.

In some configurations, the functions of the location server 32, video server 34, and user terminal 36 are performed by separate computer systems. In other configurations, these functions may be performed by one computer system. For example, one computer system may process and store device locations, video, and function as the user terminal. Alternatively, a first computing device may include the user terminal 36 and interact (e.g., through the router 20) with a second computing device that includes the location server 32 and/or video server 34.

Figure 2:
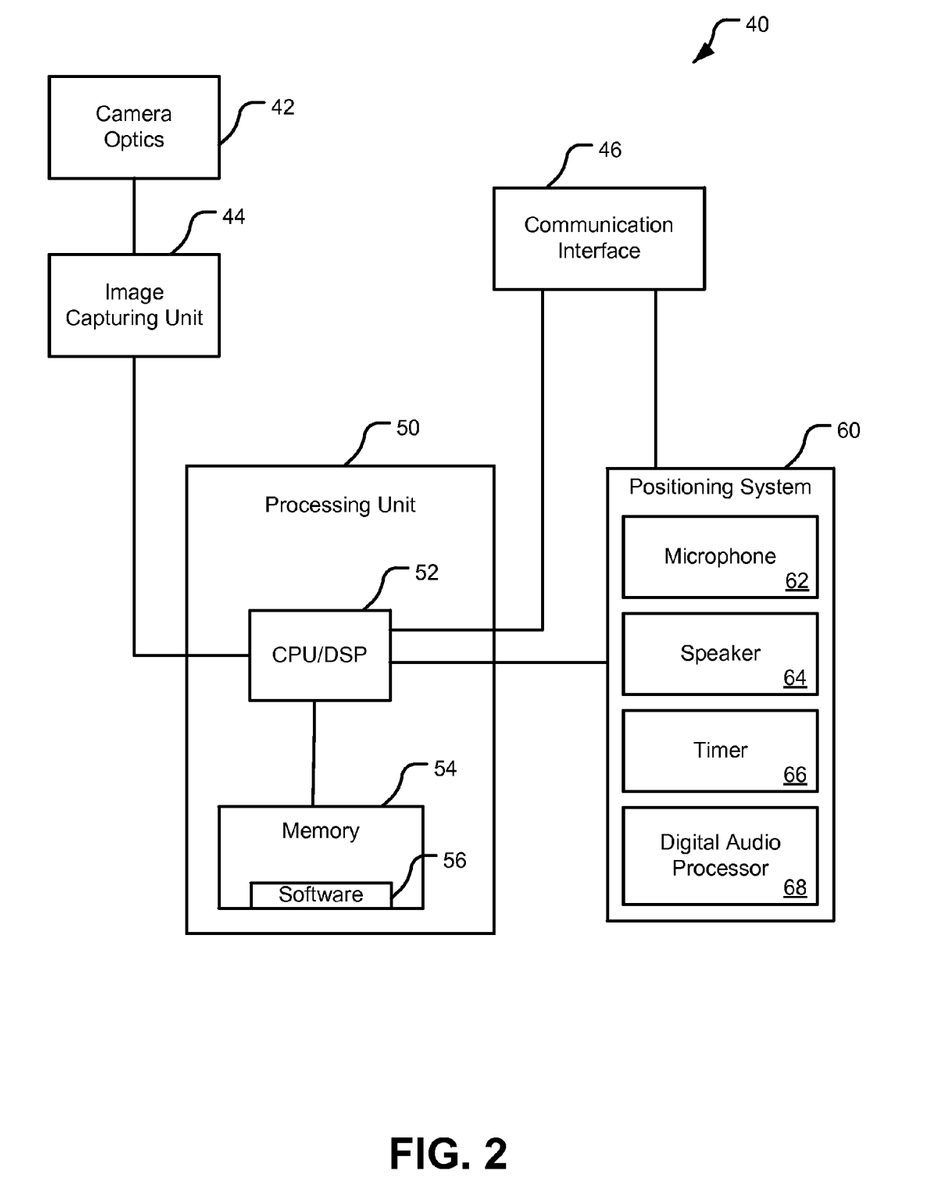
FIG. 2 is a block diagram of respective components of a camera shown in FIG. 1.

Referring to FIG. 2, an example camera 40 that can be utilized in conjunction with the techniques described herein includes camera optics 42, an image capturing unit 44, a processing unit 50, a communication interface 46, and a positioning system 60. The camera 40 may be any type of camera suitable for use within a security camera network 10, such as a fixed position camera 12, a PTZ camera 14, a slave camera 16, etc.

The camera optics 42 comprises lenses and other optical components, and is communicatively coupled with the image capturing unit 442. The image capturing unit 44 includes a charge-coupled device (CCD) and/or other technology to convert optical images into electrical information that is transferred to the processing unit 50. Also coupled with the processing unit 50 is the communication interface 46 through which information is sent to and received from the host computer system 30, e.g., through a communication network such as a local area network, a wide area network, a wireless network, etc., via the router 20. For a PTZ camera 14, a PTZ motor is utilized to actuate the camera to pan, tilt, and zoom, and may include more than one motor.

The processing unit 50 processes image information and includes a central processing unit (CPU) or digital-signal processor (DSP) 52 and memory 54. The CPU/DSP 52 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 52 is coupled to the memory 54 that includes random access memory (RAM) and read-only memory (ROM). The memory 54 is non-transitory and preferably stores machine-readable, machine-executable software code 56 containing instructions that are configured to, when executed, cause the CPU/DSP 40 to perform various functions described herein. Alternatively, the software 56 may not be directly executable by the processor CPU/DSP 52 but is configured to cause the processor CPU/DSP 52, e.g., when compiled and executed, to perform functions described herein.

The positioning system 60 is utilized by the camera 40 to obtain and/or process information relating to the position of the camera 40. Here, the positioning system 60 is configured to employ sonar-based positioning techniques using a microphone 62, speaker 64, timer 66, digital audio processor 68, etc. Other components may also be utilized in addition to, or in place of, the illustrated components of the positioning system 60.

The microphone 62 and speaker 64 operate together to emit and/or detect reference sounds associated with sonar positioning of the camera 40, such as audio pulses and/or other audio information. In order to facilitate accurate measurements of audio latency, the microphone 62 and speaker 64 are positioned substantially close to each other within the camera 40. The microphone 62 and/or speaker 64 may be internal components of the camera, or alternatively they may be external components that are communicatively coupled to the camera 40 via a wired connection (e.g., employing TLS, XLR, RCA and/or TOSLINK connectors, etc.) and/or a wireless connection. The microphone 62 and speaker are configured to have an omnidirectional and/or otherwise substantially wide polar pattern at high frequencies (e.g., greater than 16 kHz).

The timer 66 is utilized as described below to obtain information relating to latency and/or round trip times associated with an audio positioning signal. The timer 66 can be implemented as a standalone component (e.g., via a hardware oscillator and counter, etc.) and/or in software 56 stored on the memory 54 and executed by the CPU/DSP 52.

The digital audio processor 68 processes digital audio signals received by the microphone 62 and/or emitted by the speaker 64. The digital audio processor 68 includes and/or is otherwise associated with various signal converters, such as a digital to analog converter (DAC) for converting digital audio data to an analog audio signal to be transmitted by the speaker 64, an analog to digital converters (ADC) to convert an audio signal received by the microphone 62 into digital audio data, etc. The DAC and/or ADC can also operate in combination with various codecs or the like to encode and/or decode the audio signal. The digital audio processor 68 additionally implements noise reduction algorithms and/or other mechanisms for extracting audio associated with sonar positioning from ambient noise. These algorithms may include, for example, filtering using one or more high pass filters or envelope filters, and/or any other suitable algorithms. The digital audio processor 68 may also implement one or more other techniques for post-processing audio data received by the microphone 62 and/or emitted by the speaker 64.

The digital audio processor 68 may be implemented in hardware and/or software. For instance, the digital audio processor 68 may be partially or completely implemented as standalone components, or alternatively some or all of the functionality of the digital audio processor 68 may be implemented via the CPU/DSP 52 (e.g., based on software 56 stored on the memory 54). Further, some or all of the functionality performed by the positioning system 60 as described herein may be performed by an external computing device, such as a host computer system 30 or the like, based on a wired and/or wireless connection to the external device via the communication interface 46.

As described above, the positioning system 60 operates using sonar techniques to determine the distance from the camera 40 to other devices within a video surveillance system. The speaker 64 sends a reference sound, for which other devices in the system listen and respond. Based on the elapsed time between sending the reference sound and receiving a response, as well as other information provided to the positioning system 60, the distance between the camera 40 and the device from which the response was received is determined. By figuring out the distance to the nearest neighbors of the camera 40, the positioning system 60 can determine the location of the camera 40 with reduced user input. In the examples given below, the reference sound utilized by the system is provided in the form of an audible pulse or ping. However, any other reference sound could be utilized.

Figure 3:
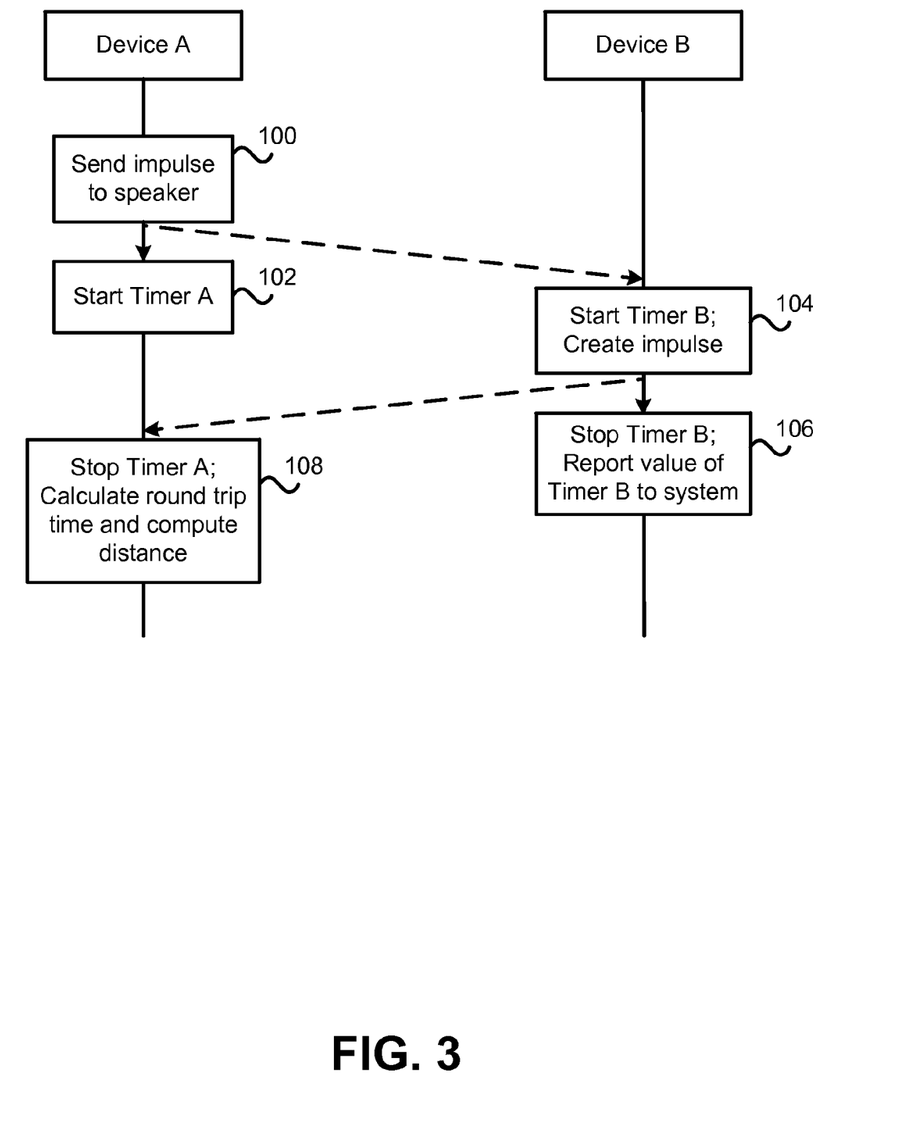
FIG. 3 is a diagram of a process for establishing device locations in a security camera network.

The distance between two devices in a surveillance system can be determined according to the procedure shown in FIG. 3. In the procedure illustrated by FIG. 3, one device acts as a master device and the other device acts as a slave device. The master device is referred to as "Device A," and the slave device is referred to as "Device B."

The procedure shown in FIG. 3 starts at block 100, in which Device A sends an audible pulse to its speaker. Device A then listens locally for this pulse, which occurs after the passage of some amount of time due to inherent latency in the audio codec utilized by Device A. When the microphone at Device A detects the local pulse, Device A starts its timer (referred to in FIG. 3 as "Timer A"), as shown at block 102.

Concurrently, Device B listens for the pulse sent by Device A. When Device B receives the pulse, it starts its local timer (referred to in FIG. 3 as "Timer B"), as shown at block 104. Additionally, Device B creates a responsive pulse and sends the pulse to its speaker upon receiving the pulse from Device A, as further shown at block 104. The responsive pulse may be generated immediately after receiving the pulse from Device A (and starting Timer B), or the responsive pulse may be generated after a period of time (e.g., to account for a transmission schedule, processing delays, etc.). Upon sending the responsive pulse to its speaker, Device B locally listens for the pulse. When the microphone at Device B detects the pulse (which will occur after the passage of some amount of time due to inherent latency in the audio codec of Device B), Device B stops the Timer B, as shown at block 106. Upon stopping the Timer B, the value of Timer B represents the amount of elapsed time between Device B receiving the pulse from Device A and locally detecting its transmitted responsive pulse. Thus, the timer reflects both processing delay associated with Device B (i.e., time between Device B receiving the pulse from Device A and generating the responsive pulse) and the latency of Device B (i.e., time between Device B generating the responsive pulse and locally detecting the responsive pulse). As further shown at block 106, the value of Timer B is reported back to the system (e.g., to Device A, the host computer 30, etc.). This reporting may occur immediately after Timer B is stopped and/or at a predetermined time after (e.g., according to a transmission delay or schedule, etc.).

Device A listens for the responsive pulse from Device B. When this pulse is detected at Device A, Timer A is stopped as shown at block 108. Thus, Timer A represents the time taken by the audio signals to travel from Device A to Device B and back, with the additional codec latency and/or other latency associated with Device B. Device A can then compute the distance between Device A and Device B based on this round trip time as described below.

As noted above, Timer A and Timer B can be used to compensate for the latency and/or processing delay on the signals transmitted between Device A and Device B in order to obtain a measure of the round trip time with higher accuracy than without such compensation. For instance, as noted above, Device A can delay starting Timer A until Device A detects its own audio pulse, thereby omitting latency in the DAC of Device A from the round trip time calculation. As Device A does not start Timer A until after its audio pulse is locally detected, the latency of the DAC of Device A need not be known in advance. This increases the reliability of measurements made at Device A since the DAC latency may not be presented to the user and/or may not be uniform across devices in all cases. Similarly, Device B can be configured to start Timer B upon detecting the audio pulse from Device A and to stop Timer B upon locally detecting its own responsive pulse. Thus, the final value of Timer B closely matches the latency of the DAC at Device B combined with any processing delay associated with responding to the audio pulse from Device A by sending the audio pulse from Device B. For instance, upon receiving an audio pulse from Device A, Device B starts Timer B but may not process and emit a responsive pulse immediately due to processor loading, resource availability, etc. Thus, when Timer B is stopped upon locally detecting the responsive audio pulse, the final value of Timer B reflects various delays associated with processing the pulse from Device A to transmit the audio pulse from Device B. Alternatively, Device B may maintain multiple timers, e.g., a first timer for processing delay and a second timer for DAC latency, and report each of these timers to the system upon sending a responsive pulse. Based on the respective timer information from Device B and Device A, Device A (or another entity, such as a host computer system 30 or the like) can calculate the round trip time of the signals by subtracting the final value of Timer B from the final value of Timer A, thereby obtaining the travel time of the audio signals from Device A to Device B and from Device B to Device A (without the respective latencies of Devices A and B).

Timer A and Timer B can provide timing information relating to Device A and Device B in any suitable unit(s) or combination(s) thereof. Here, values of Timer A and Timer B are maintained in terms of number of audio samples. To convert the values of Timer A and Timer B to a desired unit of time, the values of Timer A and Timer B can be divided by the sample rate associated with Device A and Device B, which is given in terms of audio samples per the desired unit of time.

As the round trip time between Device A and Device B is calculated by subtracting the value of Timer B from that of Timer A, the time-equivalent of the distance between Device A and Device B can also be calculated by taking the value of Timer A, subtracting the value of Timer B, and dividing by 2. As Timer A and Timer B are given in terms of number of audio samples, the value given by this calculation is the distance between the devices similarly given in terms of audio samples. This result can be converted to any desired unit of measurement by knowing the sample rate in the desired unit and the speed of sound through air relative to the desired unit. For instance, assuming the speed of sound through air is 13500 inches/second, the equation to determine the distance between Device A and Device B in inches is as follows:

$$\text{Distance} = (\text{Timer } A - \text{Timer } B) * (13500/\text{sampleRate})/2$$

where the sampleRate is in units of samples per second.

The above process is repeated for each device that can detect the pulse created by Device A. The process is propagated through each device in the system until every device knows the distances between itself and its neighbors within audible range. This process creates a web of distances, which can then be arranged on a three-dimensional map through trilateration to show the location of each device. Assuming that there are sufficient devices in the system such that each device can know the distance of at least four of its neighbors, then the positions of each device in the system can be obtained based on user input including only the position of one device in the system and the positions of its three nearest neighbors.

Based on the distances between an unlocated device and a plurality of neighboring devices with known locations, the position of the unlocated device can be determined via trilateration. Using a trilateration process, a region of uncertainty associated with the estimated position of a device becomes smaller as the number of distances to devices of known location increases. For instance, for a system of four devices, the position of the first device is user-specified since there is no distance data on which to base its location. Based on the distance from the first device to a second device, the location of the second device lies on a sphere having a center at the position of the first device and a radius of the distance between the first device and second device.

Assuming the positions of the first and second devices are known, the region of possible positions of a third device relative to the first device is similarly represented as a first sphere, and the region of possible positions of the third device relative to the second device is similarly represented as a second sphere. Thus, the region of possible locations of the third device in the system is given by a two-dimensional circle at the intersection of the two spheres. Similar calculations to determine the position of a fourth device relative to the known positions of three other devices yield a region of possible locations consisting of two points, based on the intersections of the three spheres corresponding to the distances between the fourth device and each of the three other devices. Extending these calculations to a device with four neighboring devices of known location, the corresponding spheres result in a region of intersection of a single point. Thus, the system can determine the position of a device having four neighbors with known locations with no user input relating to the position.

Based on the above, the distance between a given device and at least four other devices of known location are used as follows to measure the exact location of the device as follows. Initially, the spheres corresponding to the distances between the device and three of the previously located devices, hereinafter referred to as the "first sphere," the "second sphere"

and the "third sphere" for simplicity, are defined relative to a coordinate system of the surveillance system as follows:

$$r_1^2 = x^2 + y^2 + z^2$$

$$r_2^2 = (x-d)^2 + y^2 + z^2$$

$$r_3^2 = (x-i)^2 + (y-j)^2 + z^2$$

where $r_1$, $r_2$ and $r_3$ are the distances between the device and the first, second and third previously located devices, respectively. The coordinate system of the surveillance system is a three dimensional coordinate system that expresses the position of a given point in three dimensions (in real or arbitrary units) with respect to a reference point in the system. To simplify calculations, a coordinate rotation is applied such that the first sphere is offset relative to the second sphere on the x-axis only (by an offset of d) and relative to the third sphere on the x- and y-axes only (by an offset of (i, j)).

From these definitions, the position (x, y, z) of the device can be found according to the following equations:

$$x = \frac{r_1^2 - r_2^2 + d^2}{2d}$$

$$y = \frac{r_1^2 - r_3^2 - x^2 + (x-i)^2 + j^2}{2j} = \frac{r_1^2 - r_3^2 + i^2 + j^2}{2j} - \frac{i}{j}x$$

$$z = \pm\sqrt{r_1^2 - x^2 - y^2}$$

From these equations, two candidate points (e.g., associated with +z and −z) are associated with the location of the device. Thus, a fourth sphere can be used as a comparator to determine which of the two candidate points represent the actual location of the device. Subsequently, the locations of five devices are known, and these locations can be used to determine the location of the next closest device. This process can continue until a device is reached that is not within audible range of a sufficient number of other devices. When insufficient neighboring devices are found for a device in the system in this manner, the user may be prompted for the location of the device and/or the location(s) of neighboring device(s), or the location of the device may be computed relative to the regions of uncertainty described above. If the user is prompted for a device location, the range of possible device locations may be restricted based on the locations of known neighboring devices. For instance, the range of locations may be unlimited for zero neighbors, a sphere for one neighbor, a circle for two neighbors, a set of points for three neighbors, etc.

As a supplement to, or in place of, the trilateration techniques described above, knowledge of the environment associated with the surveillance system can be utilized to position devices within the system. For instance, various surfaces (e.g., poles, walls, ceilings, etc.) on which cameras may be mounted within the surveillance system can be provided using a set of definitions, a 3D model, or the like. When computing the position of a camera within the surveillance system, these surfaces can be utilized in addition to, or in place of, distances between the camera and other devices in the system as described above to narrow down the possible locations of the camera. Accordingly, data relating to surfaces on which a camera may be monitored can enable the position of a camera to be determined even when fewer than four neighboring devices within audible range are present. In the event that a 3D system model or other surface data is utilized in determining device locations, a user may be notified that such information was utilized in computing the location of the device. The user may then be given the option of verifying the computed location and either accepting or re-entering the location.

The number of surrounding devices needed for an accurate position determination may vary based on the nature of the surfaces within the surveillance system and/or other factors. For example, a camera mounted on a pole that intersects a sphere corresponding to the distance between the camera and another device in the system at a single point may be accurately located in some cases relative to only one neighboring device if no other mountable surfaces intersect the sphere. Knowledge of other surfaces on which a camera or other device is mounted may similarly be used to narrow down the candidate locations associated with the device. As another example, one or more rules may be defined relative to surfaces within the surveillance system (e.g., no two cameras are installed on the same pole, no two cameras installed on the same wall are positioned within a predefined lateral distance of each other, etc.) and utilized to narrow down candidate locations for a given device. These rules may be predefined for a given system and/or provided by a user on an ongoing basis. As another example, for a portion of a surveillance system corresponding to a hallway, device positioning can be performed based on a rule that the likelihood of a camera being mounted in the middle of the hallway is substantially less than that of the camera being mounted on a wall of the hallway.

Figure 4:
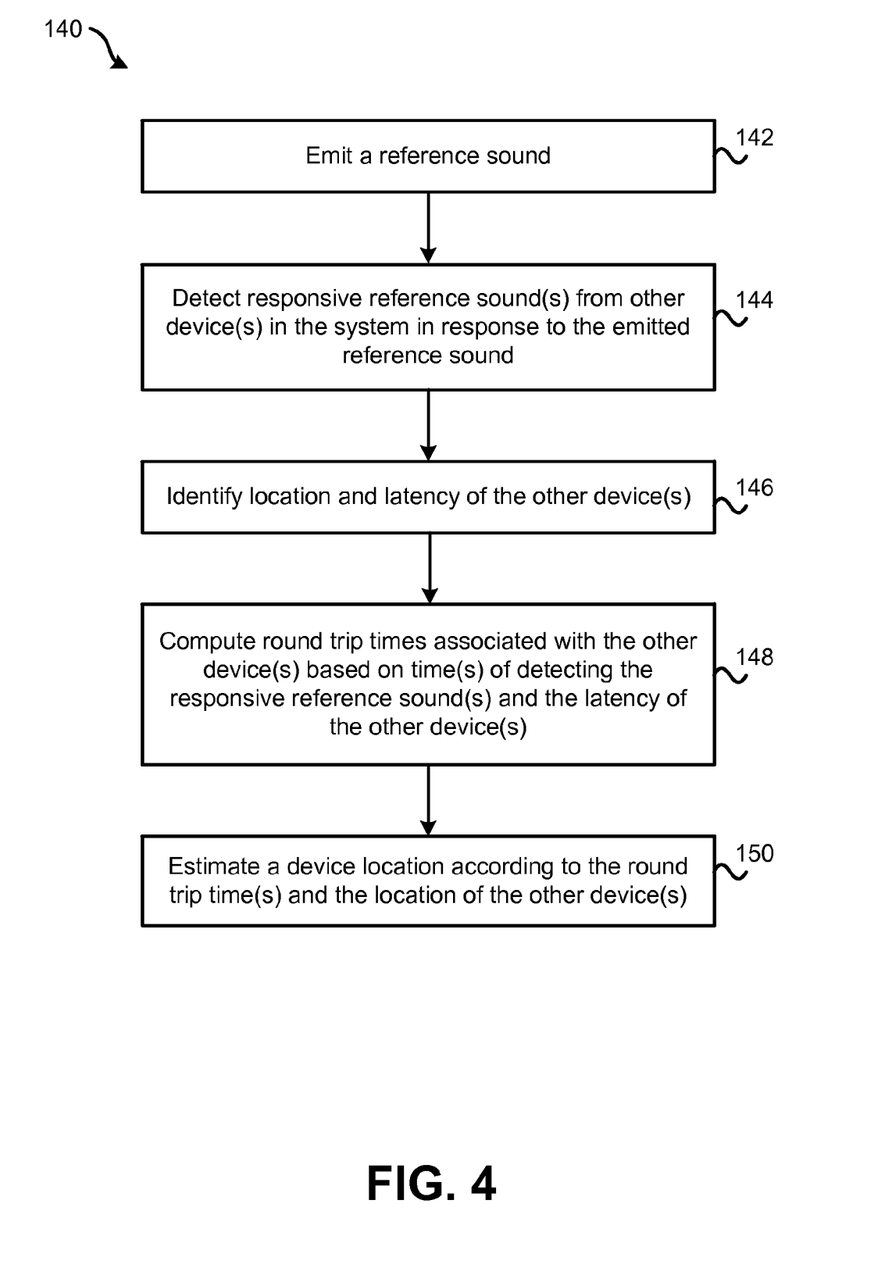
FIG. 4 is a block flow diagram of a process of estimating a device location in a security camera network.

Referring to FIG. 4, with further reference to FIGS. 1-3, a process 140 of estimating the location of a device, such as a camera 40, in a security camera network includes the stages shown. The process 140 is, however, an example only and not limiting. The process 140 can be altered, e.g., by having stages added, removed, rearranged, combined, and/or performed concurrently. Still other alterations to the process 140 as shown and described are possible. At stage 142, a reference sound is emitted. The reference sound is generated using a digital audio processor 68, which may include a DAC and/or other elements in hardware and/or software (e.g., software 56 stored by a memory 54 and executed by a CPU/DSP 52), and emitted using a speaker 64. The reference sound may be an audible pulse, impulse, ping, etc.

At stage 144, responsive reference sound(s) are detected from other device(s) in the system in response to the reference sound emitted at stage 142. The responsive reference sound(s) are detected using a microphone 62, and may be processed (e.g., to remove or reduce ambient noise) by the digital audio processor 68. At stage 146, location and latency of each of the device(s) from which the responsive reference sound(s) were received at stage 144 are identified. This information may be reported by the device(s) either directly or indirectly (e.g., through a host computer system 30 via a router 20). The latency associated with a given device is reported based at least in part on a timer value, such as Timer B illustrated in FIG. 3 and as described above.

At stage 148, round trip time(s) associated with the device(s) from which responsive reference sound(s) were received are computed based on time(s) of detecting the responsive reference sound(s) and the latency of the other device(s) as identified at stage 146. In the event that latency is maintained by a Timer A and Timer B as described above in relation to FIG. 3, this calculation can be conducted by subtracting Timer B from Timer A and dividing the result by 2. At stage 150, a device location is estimated according to the round trip time(s) computed at stage 148 and the location of the other device(s) as identified at stage 146. For instance, the location can be determined by converting the round trip time(s) to distance based on sample rate and subsequently performing trilateration as described above.

Figure 5:
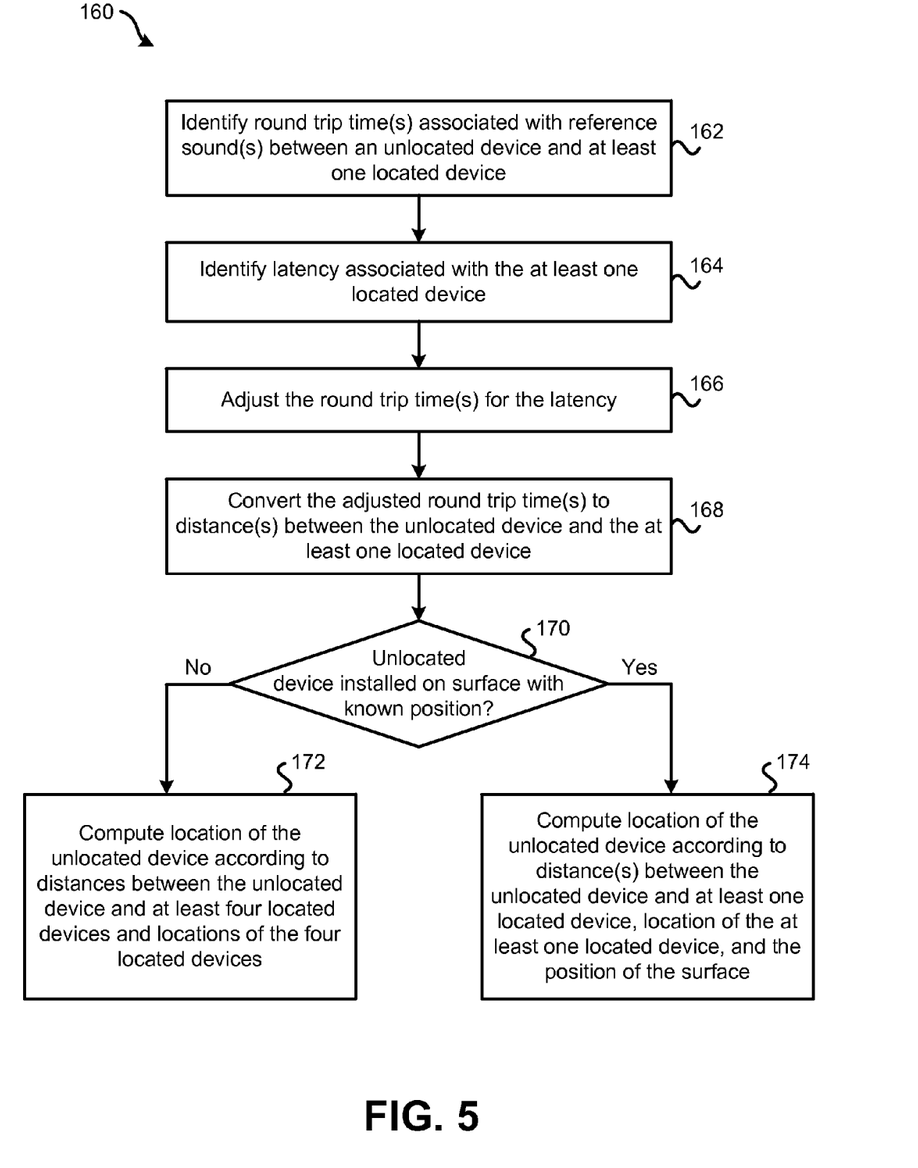
FIG. 5 is a block flow diagram of a process of computing a camera position in a surveillance system relative to previously located cameras and/or surfaces within the surveillance system.

Referring next to FIG. 5, with further reference to FIGS. 1-3, a process 160 of computing a camera position in a surveillance system relative to previously located cameras and/or surfaces within the surveillance system includes the stages shown. The process 160 is, however, an example only and not limiting. The process 160 can be altered, e.g., by having stages added, removed, rearranged, combined, and/or performed concurrently. Still other alterations to the process 160 as shown and described are possible. The process 160 can be performed by one or more entities within the surveillance system, such as a host computer system 30, a location server 32, a camera 40, etc. One or more of the operations described in process 160 can be performed in hardware and/or in software. A software implementation may be performed using, e.g., a CPU/DSP 52 at a camera 40 that executes software 56 stored on a memory 56. Similar components at other devices, including the host computer system 30, the location server 32, etc., may also be used.

The process 160 begins at stage 162, wherein round trip time(s) associated with reference sound(s) between an unlocated device and at least one located device are identified. At stage 164, latency associated with each of the at least one located device is identified. At stage 166, the round trip time(s) identified at stage 162 are adjusted for the latency of the located device(s) identified at stage 164. The operations performed at stages 162-166 can be performed in a similar manner to that described above with respect to FIG. 4, e.g., based on timers maintained at the respective devices, and/or by any other suitable means.

At stage 168, the adjusted round trip time(s) obtained at stage 166 are converted to distance(s) between the unlocated device and the at least one located device. The conversion at stage 168 may be performed based on the sample rate associated with the reference sounds, as described above.

At stage 170, the process 160 branches based on whether the unlocated device is installed on a surface having a known position (e.g., based on a previously provided definition, 3D model of the system, etc.). If the position of the surface is not known, the process 160 concludes at stage 172, wherein the location of the unlocated device is computed according to distances between the unlocated device and at least four located devices and the locations of said devices via trilateration as described above. Alternatively, if the position of the surface is known, the position of the surface can be utilized to augment the trilateration by computing the location of the unlocated device according to distance(s) between the unlocated device and at least one located device, location(s) of the at least one located device, and the position of the surface, as further described above. As additionally described above, the nature and position of the surface, as well as any rules defined with respect to the surface, may result in variations to the number of located devices utilized as reference points at stage 174. The calculations at stage 174, however, are performed relative to at least one located device in all cases.

Figure 6:
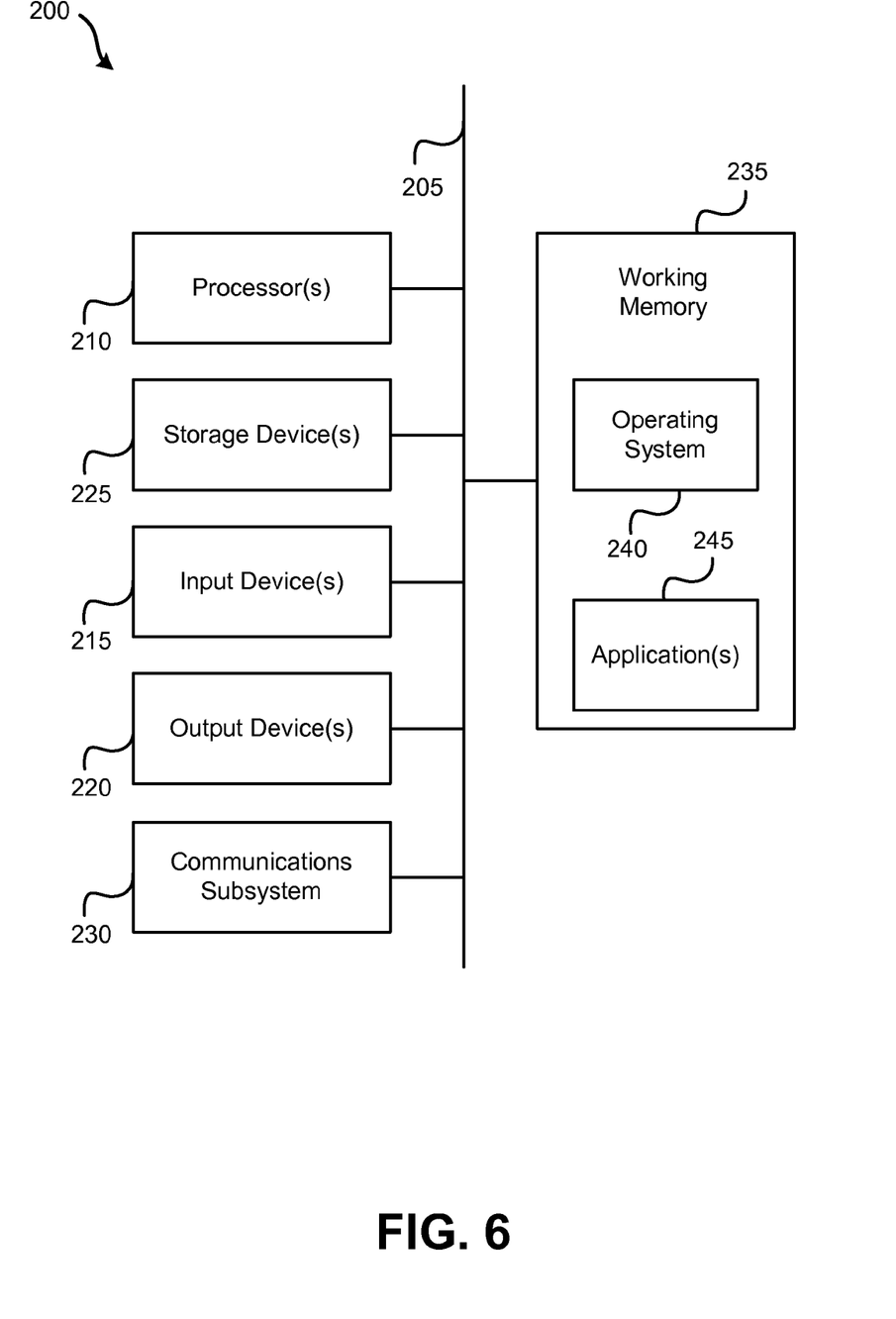
FIG. 6 illustrates a block diagram of an embodiment of a computer system.

To perform the actions of the host computer system 30, the location server 32, the positioning system 60, the user terminal 36, or any other previously described computerized system(s), a computer system as illustrated in FIG. 6 may be used. FIG. 6 provides a schematic illustration of a computer system 600 that can perform the methods provided by various other configurations, as described herein, and/or can function as the host computer system, a remote kiosk/terminal, a point-of-sale device, a mobile device, and/or a computer system. FIG. 6 provides a generalized illustration of various components, any or all of which may be utilized as appropriate. FIG. 6, therefore, broadly illustrates how individual system elements may be implemented in a relatively separated or relatively more integrated manner.

The computer system 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a mouse, a keyboard and/or the like; and one or more output devices 220, which can include without limitation a display device, a printer and/or the like.

The computer system 200 may further include (and/or be in communication with) one or more non-transitory storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 230 may permit data to be exchanged with a network (such as the network described below, to name one example), other computer systems, and/or any other devices described herein. In many configurations, the computer system 200 will further comprise a working memory 235, which can include a RAM or ROM device, as described above.

The computer system 200 also can comprise software elements, shown as being currently located within the working memory 235, including an operating system 240, device drivers, executable libraries, and/or other code, such as one or more application programs 245, which may comprise computer programs provided by various configurations, and/or may be designed to implement methods, and/or configure systems, provided by other configurations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computer system, such as the system 200. In other configurations, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.), then takes the form of executable code.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations may employ a computer system (such as the computer system 200) to perform methods in accordance with various configurations of the invention. According to a set of configurations, some or all of the procedures of such methods are performed by the computer system 200 in response to processor 210 executing one or more sequences of one or more instructions (which might be incorporated into the operating system 240 and/or other code, such as an application program 245) contained in the working memory 235. Such instructions may be read into the working memory 235 from another computer-readable medium, such as one or more of the storage device(s) 225. Merely by way of example, execution of the sequences of instructions contained in the working memory 235 might cause the processor(s) 210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 200, various computer-readable media might be involved in providing instructions/code to processor(s) 210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 225. Volatile media include, without limitation, dynamic memory, such as the working memory 235. Transmission media include, without limitation, coaxial cables, copper wire and fiber optics, including the wires that comprise the bus 205, as well as the various components of the communication subsystem 230 (and/or the media by which the communications subsystem 230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various configurations of the invention.

The communications subsystem 230 (and/or components thereof) generally will receive the signals, and the bus 205 then might carry the signals (and/or the data, instructions, etc. carried by the signals) to the working memory 235, from which the processor(s) 205 retrieves and executes the instructions. The instructions received by the working memory 235 may optionally be stored on a storage device 225 either before or after execution by the processor(s) 210.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details techniques in the context of a security camera system. However, the systems and methods described herein may be applicable to other forms of camera systems.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of calculating position of a device within a video surveillance system, the method comprising:
   generating a reference sound;
   emitting, at a first device, the reference sound;
   detecting, at the first device, a responsive reference sound from each of one or more second devices in response to the emitted reference sound;
   identifying a position of each of the one or more second devices;
   obtaining information relating to a latency of each of the one or more second devices;
   computing a round trip time associated with each of the one or more second devices based on at least a timing of detecting each of the one or more responsive reference sounds and the latency of each of the one or more second devices; and
   estimating the position of the first device according to the round trip time and the position associated with each of the one or more second devices, wherein the estimating comprises converting the round trip time associated with each of the one or more second devices to the distance between the first device and each of the one or more second devices based on a sample rate of the reference sound and each of the one or more responsive reference sounds.

2. The method of claim 1 wherein the estimating further comprises estimating the position of the first device by performing trilateration with respect to the positions of at least four second devices and distances between the first device and the at least four second devices.

3. The method of claim 1 wherein the estimating further comprises:
   identifying information relating to one or more device mounting surfaces in the video surveillance system; and
   estimating the position of the first device according to the distance between the first device and each of the one or more second devices and the information relating to the one or more mounting surfaces.

4. The method of claim 3 wherein the information relating to the one or more mounting surfaces comprises a three-dimensional model of the video surveillance system.

5. A method of calculating position of a device within a video surveillance system, the method comprising:
   generating a reference sound;
   emitting, at a first device, the reference sound;
   detecting, at the first device, a responsive reference sound from each of one or more second devices in response to the emitted reference sound;
   identifying a position of each of the one or more second devices;
   obtaining information relating to a latency of each of the one or more second devices;
   computing a round trip time associated with each of the one or more second devices based on at least a timing of detecting each of the one or more responsive reference sounds and the latency of each of the one or more second devices; and
   estimating the position of the first device according to the round trip time and the position associated with each of the one or more second devices
   detecting, at the first device, the reference sound;
   starting a first timer at the first device in response to detecting the reference sound;
   stopping the first timer in response to detecting a responsive reference sound from at least one of the one or more second devices;
   obtaining the information relating to the latency of each of the one or more second devices comprises obtaining a value of a second timer maintained by each of the one or more second devices in association with generating and emitting the responsive reference sound; and
   computing the round trip times comprises computing a round trip time corresponding to a selected second device by dividing a result of subtracting the second timer of the selected second device from the first timer by 2.

6. The method of claim 1 wherein the detecting comprises:
   identifying ambient noise in audio received at the first device;
   removing the ambient noise from the audio received at the first device to obtain resulting audio; and
   detecting the responsive reference sounds within the resulting audio.

7. The method of claim 1 wherein identifying the position of each of the one or more second devices comprises receiving the position of at least one of the one or more second devices as user input.

8. The method of claim 1 wherein the reference sound and each of the responsive reference sounds are at least one of an audible ping or an audio pulse.

9. A security device positioning system comprising:
   a digital audio processor configured to generate a reference sound;
   a speaker communicatively coupled to the digital audio processor and configured to emit, at a first security device, the reference sound;
   a microphone communicatively coupled to the digital audio processor and configured to detect, at the first security device, a responsive reference sound from each of one or more second security devices;
   a timer communicatively coupled to the digital audio processor, the speaker and the microphone and configured to measure, for each of the one or more second security devices, elapsed time between the speaker emitting the reference sound and the microphone detecting the responsive reference sound from each of the one or more second security devices;
   a communication interface communicatively coupled to the timer and configured to communicate information relating to the elapsed time for each of the one or more second security devices, position of each of the one or more second security devices and latency of each of the one or more second security devices;
   a processor communicatively coupled to the communications subsystem and configured to compute a round trip time associated with each of the one or more second security devices based on at least the elapsed time of each of the one or more second security devices and the latencies of each of the one or more second security devices and to estimate the position of the first security device according to the round trip time associated with each of the one or more second security devices and the position of each of the one or more second security devices; and a memory communicatively coupled to the communication interface and the processor.

10. The system of claim 9 wherein the processor is further configured to convert the round trip time associated with each of the one or more second security devices to distance between the first security device and each of the one or more second security devices based on a sample rate of the reference sound and each of the responsive reference sounds.

11. The system of claim 10 wherein the processor is further configured to estimate the position of the first security device by performing trilateration with respect to the positions of at least four second security devices and distances between the first security device and the at least four second security devices.

12. The system of claim 10 wherein:
the memory is configured to store data relating to one or more device mounting surfaces in the video surveillance system; and
the processor is configured to estimate the position of the first security device according to the distance between the first security device and each of the one or more second security devices and the information relating to the one or more mounting surfaces.

13. The system of claim 9 wherein the digital audio processor is further configured to identify ambient noise in audio received by the microphone, to remove the ambient noise from the received audio to obtain resulting audio, and to detect each of the responsive reference sounds within the resulting audio.

14. The system of claim 9 further comprising a user terminal communicatively coupled to the processor and configured to obtain the position of at least one of the one or more second security devices as user input.

15. The system of claim 9 wherein the digital audio processor, the speaker, the microphone and the timer are located at the first security device.

16. The system of claim 9 wherein the communication interface, the processor and the memory are located at a location server.

17. A system for estimating a position of a first device within a video surveillance system, the system comprising:
signal generator means configured to generate a reference sound;
a speaker communicatively coupled to the signal generator means and configured to emit the reference sound;
a microphone communicatively coupled to the signal generator means and configured to detect responsive reference sounds from each of one or more second devices in response to the emitted reference sound;
device information means configured to identify position and latency of each of the one or more second devices;
time calculation means communicatively coupled to the speaker, the microphone and the device information means and configured to compute round trip time associated with each of the one or more located devices based on at least times of detecting each of the audio response pulses and the latency of each of the one or more second devices; and
positioning means communicatively coupled to the time calculation means and configured to estimate the position of the first device according to each of the round trip times and the position of each of the one or more second devices, wherein the positioning means is further configured to convert the round trip time associated with each of the one or more second devices to distance between the first device and each of the one or more second devices based on a sample rate of the audio pulse and the audio response pulses and to estimate the position of the first device according to each of the converted distances.

18. The system of claim 17 wherein the positioning means is further configured to estimate the position of the first device according to each of the converted distances and information relating to one or more device mounting surfaces in the video surveillance system.

19. The system of claim 17 further comprising noise reduction means communicatively coupled to the microphone and configured to identify ambient noise in audio received by the microphone and to remove the ambient noise from the audio received at the microphone to obtain resulting audio, wherein the microphone is configured to detect the responsive reference sounds within the resulting audio.

20. The system of claim 17 further comprising user interface means communicatively coupled to the positioning means and configured to receive the position of at least one of the one or more second devices as user input.

21. A computer program product residing on a non-transitory computer storage medium, the computer program product comprising processor-executable instructions configured to cause a processor to:
generate a reference sound;
cause the reference sound to be emitted at a first device;
detect a responsive reference sound at the first device from each of one or more second devices in response to the emitted reference sound;
identify a position of each of the one or more second devices;
obtain information relating to a latency of each of the one or more second devices;
compute a round trip time associated with each of the one or more second devices based on at least a timing of detecting each of the one or more responsive reference sounds and the latency of each of the one or more second devices; and
estimate the position of the first device according to the round trip time and the position associated with each of the one or more second devices and convert the round trip time associated with each of the one or more second devices to the distance between the first device and each of the one or more second devices based on a sample rate of the reference sound and each of the one or more responsive reference sounds.

22. The computer program product of claim 21 wherein the instructions configured to cause the processor to estimate are further configured to cause the processor to:
identify information relating to one or more device mounting surfaces in the video surveillance system; and
estimate the position of the first device according to the distance between the first device and each of the one or more second devices and the information relating to the one or more mounting surfaces.

23. The computer program product of claim 21 wherein the instructions configured to cause the processor to detect comprise instructions configured to cause the processor to:
identify ambient noise in audio received at the first device;
remove the ambient noise from the audio received at the first device to obtain resulting audio; and
detect the responsive reference sounds within the resulting audio.

* * * * *